US010008240B2

(12) United States Patent
Koide et al.

(10) Patent No.: US 10,008,240 B2
(45) Date of Patent: Jun. 26, 2018

(54) CASE VIDEO PROCESSING APPARATUS, CASE VIDEO PROCESSING SYSTEM, AND CASE VIDEO PROCESSING METHOD

(71) Applicant: Panasonic Intellectual Property Management Co., Ltd., Osaka (JP)

(72) Inventors: Youhei Koide, Fukuoka (JP); Yasuo Yomogida, Fukuoka (JP); Kazuya Waniguchi, Fukuoka (JP); Yasushi Yokomitsu, Fukuoka (JP); Toshiaki Shinohara, Fukuoka (JP); Hiroyuki Seguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/017,180

(22) Filed: Feb. 5, 2016

(65) Prior Publication Data
US 2016/0307600 A1    Oct. 20, 2016

(30) Foreign Application Priority Data

Apr. 16, 2015   (JP) ................................ 2015-084487

(51) Int. Cl.
| | |
|---|---|
| H04N 5/93 | (2006.01) |
| G11B 27/036 | (2006.01) |
| G06K 9/20 | (2006.01) |
| G11B 27/00 | (2006.01) |
| H04N 9/80 | (2006.01) |
| G06K 9/00 | (2006.01) |

(52) U.S. Cl.
CPC .......... *G11B 27/036* (2013.01); *G06K 9/2081* (2013.01); *G06K 9/00228* (2013.01); *G06K 9/00711* (2013.01)

(58) Field of Classification Search
USPC ................ 386/280, 282, 278, 239, 240, 248
See application file for complete search history.

(56) References Cited

U.S. PATENT DOCUMENTS

| | | | |
|---|---|---|---|
| 7,440,594 B2 | 10/2008 | Takenaka | |
| 8,300,899 B2 | 10/2012 | Masuda | |
| 2004/0008873 A1* | 1/2004 | Sogo | .................. G06K 9/00288 382/118 |

(Continued)

FOREIGN PATENT DOCUMENTS

| | | |
|---|---|---|
| JP | 2004-062560 A | 2/2004 |
| JP | 2008-197837 A | 8/2008 |

(Continued)

*Primary Examiner* — Daquan Zhao
(74) *Attorney, Agent, or Firm* — Seed IP Law Group LLP

(57) ABSTRACT

A video input unit inputs case video data to be processed, a face detector detects a face region of a person included in an image of video data, a target manager registers the face region as a region to be masked, an operation input inputs a user's instruction regarding the face region, a target manager excludes a region designated by the user's instruction from targets to be masked and registers the region as a region not to be masked, an image processor performs a masking process on the region to be masked, and a video output unit outputs video data having been subjected to image processing including the masking process.

5 Claims, 16 Drawing Sheets

(56) References Cited

U.S. PATENT DOCUMENTS

| | | | |
|---|---|---|---|
| 2004/0081338 A1* | 4/2004 | Takenaka | G08B 13/1961 382/118 |
| 2008/0193018 A1 | 8/2008 | Masuda | |
| 2009/0284799 A1 | 11/2009 | Matsuhira | |
| 2012/0327172 A1* | 12/2012 | El-Saban | G06K 9/00228 348/14.02 |
| 2014/0164413 A1 | 6/2014 | Matsumoto et al. | |
| 2015/0016684 A1 | 1/2015 | Matsumoto et al. | |
| 2015/0161467 A1* | 6/2015 | Honda | G06K 9/00228 382/203 |

FOREIGN PATENT DOCUMENTS

| | | |
|---|---|---|
| JP | 2009-278325 A | 11/2009 |
| JP | 2013-030104 A | 2/2013 |
| WO | 2013/132836 A1 | 9/2013 |

* cited by examiner

FIG. 13

| Time (Local) | User | Description |
|---|---|---|
| 14-Mar-2015 16:39:55 | Taro Matsushita | Application Launch from System X |
| 14-Mar-2015 16:39:55 | Taro Matsushita | Application Login Success from System X |
| 14-Mar-2015 16:39:56 | Taro Matsushita | Import movie filename xxxxx.av3 from system X |
| 14-Mar-2015 16:39:56 | Taro Matsushita | Import movie case number 12345-5555 with xxxxx.av3 from system X |
| 14-Mar-2015 16:39:56 | Taro Matsushita | Import movie accused person1 Jiro Yougisha with xxxxx.av3 from system X |
| 14-Mar-2015 16:40:21 | Taro Matsushita | Designate x:280,y:300  ROI 40,64 as Jiro Yougisha at frame number 60 |
| 14-Mar-2015 16:41:05 | Taro Matsushita | Designate 2 persons (001 x:240,y:240,y:100 ROI 30, 56, 002x:240. y:200 ROI 30,48) as privacy masking target at frame number 60 |
| 14-Mar-2015 16:41:05 | Taro Matsushita | Execute privacy masking to 2 persons (001, 002) since frame number 60 |

FIG. 15

| Case Number | Accused Person | Retention Period | Video file |
|---|---|---|---|
| 12345-5555 | Jiro Yougisha | 30 years | xxxxxx.av3 |
| 12345-5555 | Jiro Yougisha | 30 years | Xxxxxxx_01.av3 |
| 12345-5555 | Jiro Yougisha | 30 years | Xxxxxxx_02.av3 |

LOG DATA

| Time | User | Description |
|---|---|---|
| CASE A 12345-5555 | | |
| 15-Mar-2015 | Taro | Video xxxx.av3 |
| ... | ... | ... |
| CASE B 99999-1111 | | |
| 15-Mar-2015 | Taro | Video yyyy.av3 |
| ... | ... | ... |
| CASE A 12345-5555 | | |
| 16-Mar-2015 | Taro | Video zzzz.av3 |
| ... | ... | ... |

| Case Number | Accused Person | Retention Period | Video file | Log file |
|---|---|---|---|---|
| 12345-5555 | Jiro Yougisha | 30 years | xxxx.av3 | log12345 |
| 12345-5555 | Jiro Yougisha | 30 years | zzzz.av3 | log12345 |
| 99999-1111 | Yasu Hannin | 60 years | yyyy.av3 | log99999 |

CASE VIDEO PROCESSING APPARATUS, CASE VIDEO PROCESSING SYSTEM, AND CASE VIDEO PROCESSING METHOD

BACKGROUND OF THE INVENTION

1. Field of the Invention

The present invention relates to a case video processing apparatus that processes video data of a case which is dealt with in, for example, a police station or the like, a case video processing system, and a case video processing method.

2. Description of the Related Art

For example, case video management systems that manage video data related to a case in a police station or the like and use the video data as evidence or the like have been examined and introduced. When the case video management system is used in a police station, the case video management system has a function of storing video data, captured in a case scene or the like, in a server and managing the video data so that the retrieval, reproduction, and the like thereof can be facilitated later. A video related to a case is captured by an on-vehicle camera mounted on a police car, a monitoring camera installed in an outdoor or indoor place, a wearable camera which is worn on a police, or the like, and is transmitted to and stored in a server of the case video management system.

In a video related to a case, a person unrelated to the case may be captured, and thus it is desired that the specification of a person is made difficult by performing a masking process on the person's face or the like in order to protect the privacy of such an unspecified person who is unrelated to the case.

As an example of the related art of a masking process, for example, Japanese Patent Unexamined Publication No. 2009-278325 discloses an image processing apparatus and an image processing method which are capable of appropriately performing a masking process on a person in an image. The image processing apparatus as the example of the related art is configured such that image data is analyzed, a person's both eyes are detected in an image, an inclination of a mask having a substantially rectangular shape is determined on the basis of an inclination of a straight line connecting both eyes, and a masking process is performed on a portion of the eyes in the person's face in a substantially rectangular shape.

In an image processing apparatus such as the example of the related art, it is possible to appropriately perform a masking process on a person to be processed, but the determination of a target to be processed is not considered. For this reason, in the case of aiming at privacy protection in video data related to a case, a problem that a masking process is not performed on a necessary target such as an unrelated person occurs.

SUMMARY OF THE INVENTION

In order to solve such a problem, the present disclosure provides a case video processing apparatus, a case video processing system, a case video processing method, and a program which are capable of performing an appropriate masking process on a necessary target in video data and improving a privacy protection function.

The present disclosure provides a case video processing apparatus that performs image processing of video data related to a case, the case video processing apparatus including a processor, and a memory. In cooperation with the memory, the processor inputs video data to be processed which is recorded in a storage of a case video management system, detects a face region of a person included in an image of the video data, registers the face region as a region to be masked, inputs a user's instruction regarding the face region, excludes a region designated by the user's instruction from targets to be masked and registers the region as a region not to be masked, performs a masking process on the region to be masked, and outputs video data having been subjected to image processing including the masking process.

According to the present disclosure, it is possible to perform appropriate masking process on a necessary target in video data and to improve a privacy protection function.

BRIEF DESCRIPTION OF DRAWINGS

FIG. 13 is a diagram illustrating an example of log data regarding a case video editing process;

FIG. 15 is a diagram illustrating an example of video management data of a case video.

DETAILED DESCRIPTION OF THE PREFERRED EMBODIMENT

Hereinafter, an embodiment (hereinafter, referred to as "the present exemplary embodiment") in which a detailed description is given of a case video processing apparatus, a case video processing system, a case video processing method, and a program according to the invention will be described in detail with reference to the accompanying drawings as appropriate. However, descriptions with more detail than necessary may be omitted. For example, the detailed description of matters which are already well-known and the repeated description of the substantially same structures may be omitted. This is for the purpose of avoiding the following description from being unnecessarily redundant and to allow those skilled in the art to easily understand them. Meanwhile, the accompanying drawings and the following descriptions are provided to allow those skilled in the art to sufficiently understand the present disclosure, and the subject described in the claims is not intended to be restricted by the drawings and the descriptions.

Schematic Configuration of Case Video Processing System

Figure 1:
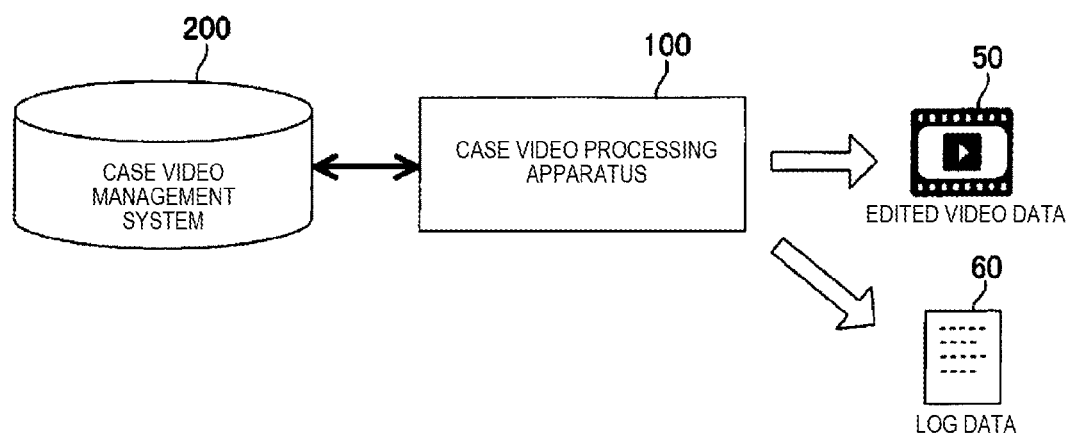
FIG. 1 is a diagram illustrating a schematic configuration of the entire case video processing system according to the present exemplary embodiment.

First, a configuration of a case video processing system including a case video processing apparatus according to the present exemplary embodiment will be described with reference to FIG. 1. FIG. 1 is a diagram illustrating a schematic configuration of the entire case video processing system according to the present exemplary embodiment. Hereinafter, examples of a configuration and an operation in a case where a case video processing apparatus and a case video processing system according to the present exemplary embodiment are used in a police station will be described. Meanwhile, the case video processing system can also be used in other administrative organs, business entities, and the like without being limited to being installed in a police station.

Case video processing apparatus 100 is operated in association with case video management system 200, and constitutes a case video processing system that processes video data related to a case. Case video management system 200 stores video data (hereinafter, also referred to as "case video data") related to a case captured by an on-vehicle camera mounted on a police car, a monitoring camera installed in an outdoor or indoor place, a wearable camera worn on a police, or the like in a storage and records the stored video data together with video management data to thereby manage a case video. Case video management system 200 is a back-end system, regarding the recording of a case video by a police station, which is constructed by a server and a computer managed inside or outside the police station. Case video management system 200 manages a video related to a case in a database, and is used to use the video as evidence or the like. Video data related to a case is video data captured in a case scene, a police station, or the like, and includes a video obtained by capturing the state of a scene when a case occurs, a video obtained by capturing the action of a person such as an accused person related to the case, a video obtained by capturing a state such as interrogation, arrest, transfer, or investigation of an accused person by a police, and the like.

Case video processing apparatus 100 performs a video editing process including a masking process of reading out video data related to a case from case video management system 200 and making it difficult to specify a person, and outputs the video data as edited video data 50. Case video processing apparatus 100 is constituted by a computer, such as a personal computer (PC), which is provided inside a police station or the like. Case video processing apparatus 100 generates log data 60 regarding the video editing process, and outputs edited video data 50 and log data 60 associated with each other to case video management system 200 and stores the pieces of data. In this manner, case video processing apparatus 100 has a function of performing a video editing process, has a function of generating log data regarding the video editing process, and is operated as a case video log data generating apparatus.

Figure 2:
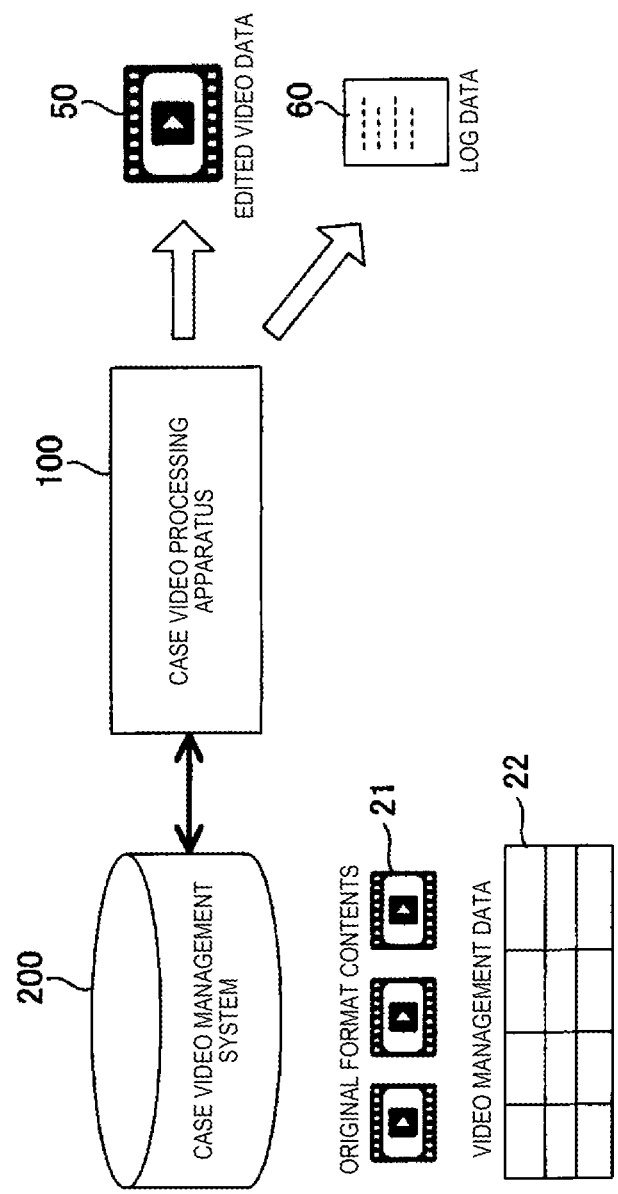
FIG. 2 is a diagram illustrating a first example of association between a case video processing apparatus and a case video management system.

FIG. 2 is a diagram illustrating a first example of association between a case video processing apparatus and a case video management system. The first example is a configuration example in a case where case video processing apparatus 100 is directly associated with case video management system 200. Case video management system 200 has a database that stores video data (original format contents) 21 having an original format used for video data related to a case and video management data 22 related to video data 21. Video management data 22 includes related information such as a recording date and time, a recording location, a recorder, a recording device, video attribution information, a video data file name, a case number of a corresponding case, an accused person, and a retention period with respect to each of the pieces of video data 21. Case video processing apparatus 100 performs a video editing process including a masking process on video data 21 having an original format, generates edited video data 50 and log data 60, and outputs the pieces of data. Edited video data 50 may be output in a state of being edited in an original format, and may be output in a state of being converted into video data having a general-purpose format such as MP4.

Figure 3:
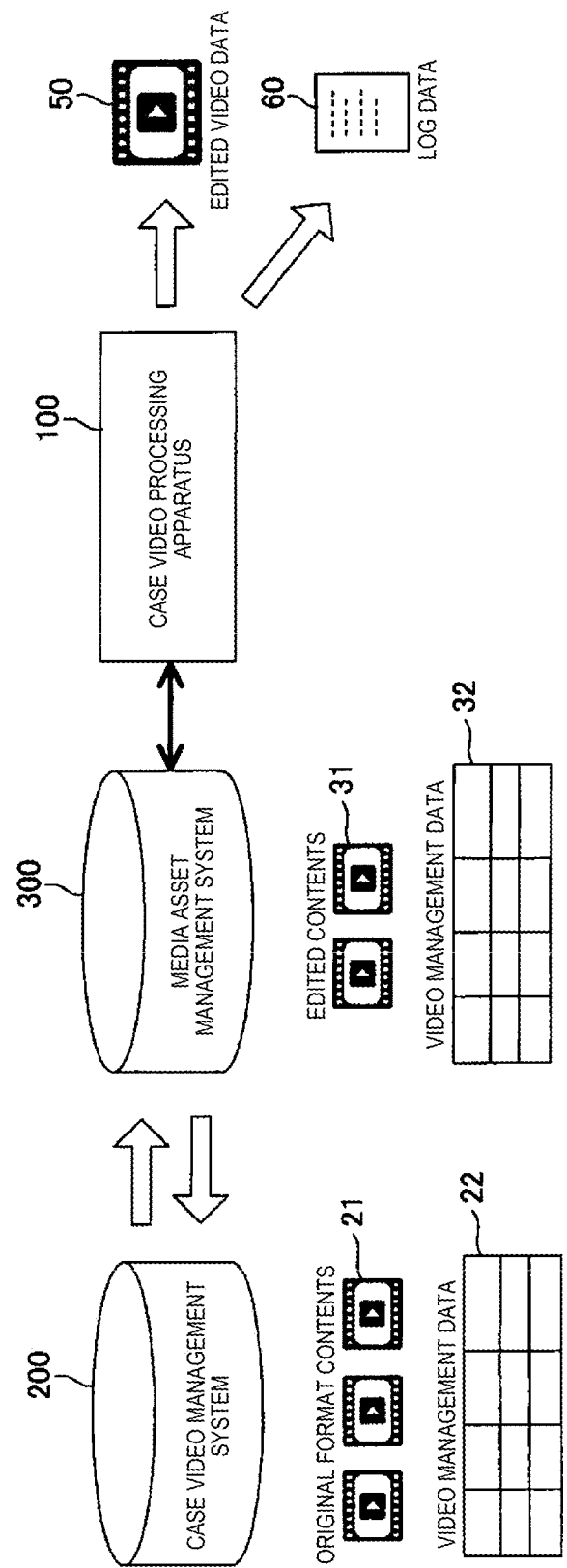
FIG. 3 is a diagram illustrating a second example of association between the case video processing apparatus and the case video management system.

FIG. 3 is a diagram illustrating a second example of association between the case video processing apparatus and the case video management system. The second example is a configuration example in a case where case video processing apparatus 100 is associated with case video management system 200 through Media Asset Management (MAM) system 300. Media asset management system 300 is a digital asset management system for video data or the like mainly used in an organization, such as a broadcasting state, which deals with a large amount of contents. Here, a system, constructed by a server and a computer managed inside or outside a police station, which supports the editing of video data and manages the edited video data (edited contents), is assumed as media asset management system 300. Video data having a format (general-purpose format such as MP4) which is suitable for image editing is recorded in media asset management system 300. Media asset management system 300 has a database that stores video data (edited contents) 31 obtained by edited video data related to a case and video management data 32 related to video data 31. Case video processing apparatus 100 performs a video editing process including a masking process on video data 31 which is read out from case video management system 200 through media asset management system 300, generates edited video data 50 and log data 60, and outputs the generated pieces of data. Edited video data 50 may be output in a state of being edited in a general-purpose format, and may be output in a state of being converted into video data having the original format.

Configuration of Case Video Processing Apparatus

Figure 4:
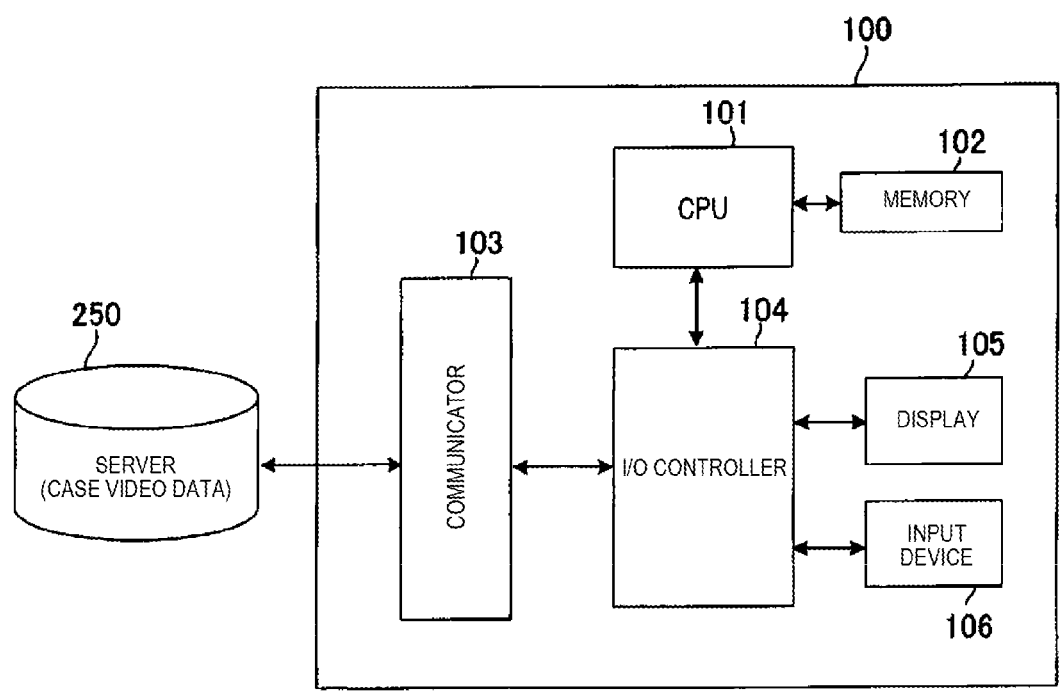
FIG. 4 is a block diagram illustrating an example of an internal configuration of the case video processing apparatus.

FIG. 4 is a block diagram illustrating an example of an internal configuration of a case video processing apparatus. Case video processing apparatus (case video log data generating apparatus) 100 is constituted by a computer, such as a personal computer (PC), which processes various pieces of data regarding case video data and controls the processing thereof, and has a function realized by the computer executing a predetermined software program. Case video processing apparatus 100 includes Central Processing Unit (CPU) 101 as a processor, memory 102 as a main storage, communicator 103 that communicates with an external device, and I/O controller 104 that controls the input and output of data. In addition, case video processing apparatus 100 includes display 105 constituted by a liquid crystal display or the like that displays an application execution screen and a video data reproduction screen, and input device 106 constituted by a keyboard, a mouse, a touch panel, or the like that inputs a user's instruction operation. Communicator 103 communicates with server 250 of case video management system 200 in a wired or wireless manner through a communication path such as a wired network or a wireless network, and transmits and receives video management data including case video data and log data. Server 250 of case video management system 200 includes a storage which is a data recording device that records the case video data and the video management data.

Figure 5:
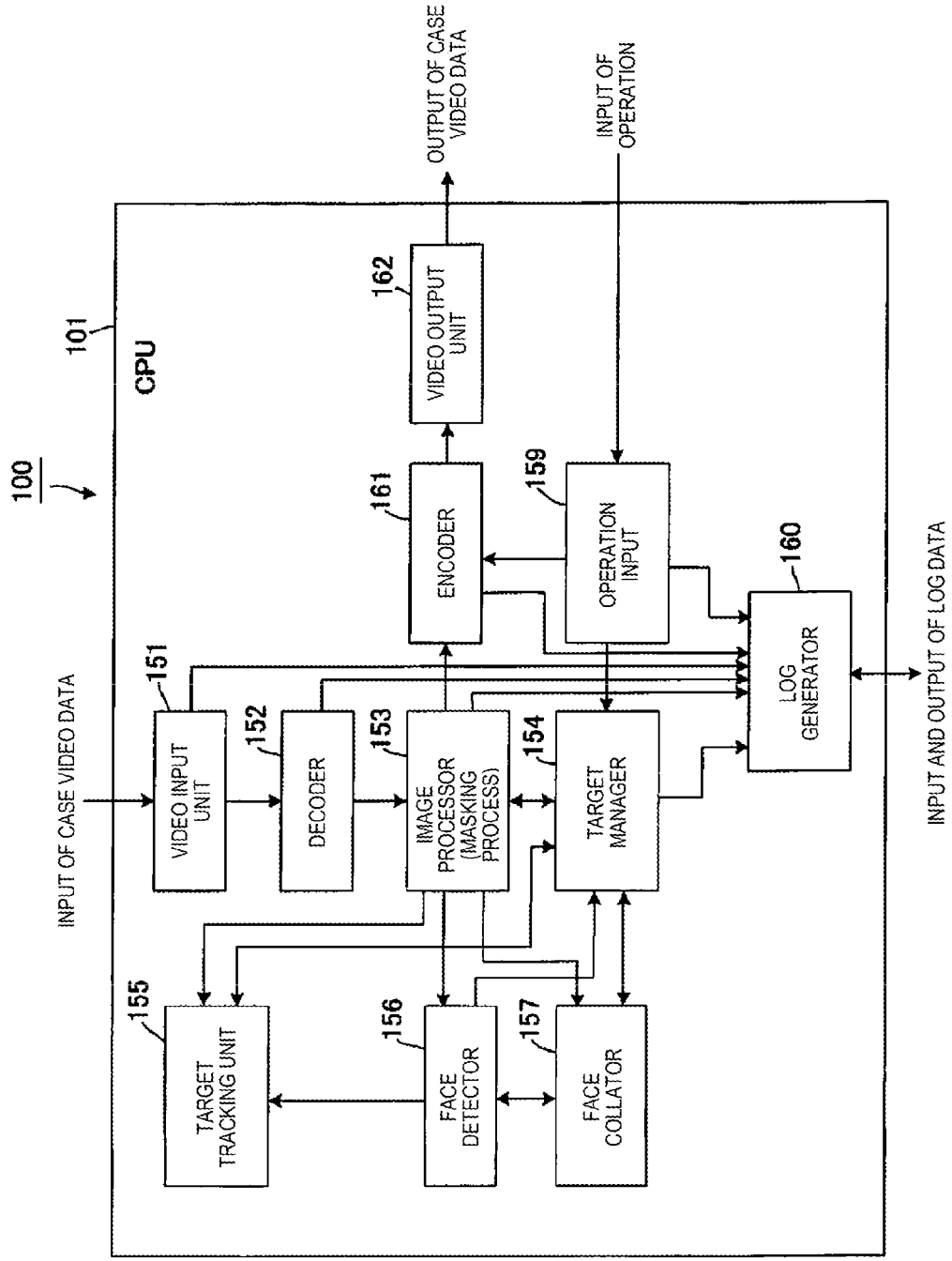
FIG. 5 is a block diagram illustrating a first example of a functional configuration of the case video processing apparatus.

FIG. 5 is a block diagram illustrating a first example of a functional configuration of the case video processing apparatus. FIG. 5 schematically illustrates functions realized by a predetermined software program being executed by cooperation of CPU 101 and memory 102 of case video processing apparatus 100 illustrated in FIG. 4. Case video processing apparatus 100 includes video input unit 151, decoder 152, image processor 153, target manager 154, target tracking unit 155, face detector 156, face collator 157, operation input 159, log generator 160, encoder 161, and video output unit 162.

Video input unit 151 inputs case video data which is read out from server 250 of case video management system 200 as video data to be processed, and transfers the video data to decoder 152. Decoder 152 decodes the input video data to be processed to thereby generate image data of a still image for each frame in which image processing can be performed. Image processor 153 performs image processing including a masking process of making it difficult to specify a person, on the image data of the still image to be processed.

Face detector 156 detects a face region of a person included in an image, and outputs coordinate data regarding the detected face region. Face collator 157 compares the face region detected by face detector 156 with registered face collation data and determines whether face characteristics thereof conform to each other. Face collation data having a face characteristic of a person (here, an accused person) who is set as a target not to be masked is used. Target tracking unit 155 searches for a region for to be masked on which a masking process is performed in image data of the previous frame, and tracks the target to be masked between frames.

Target manager 154 generates and updates target management data regarding a target to be masked in image data and regions not to be masked, and manages a region to be masked on which a masking process is performed and the regions not to be masked, on which a masking process is not performed. At this time, target manager 154 registers the face region detected by face detector 156 as a target to be masked, and excludes a face region, designated by a user's instruction for an operation input performed using operation input 159, from targets to be masked as a region not to be masked. In addition, target manager 154 registers an additional region to be masked which is designated by a user's instruction for an operation input performed using operation input 159.

Operation input 159 inputs a user's operation input performed using input device 106 constituted by a keyboard, a mouse, a touch panel, or the like, and transmits a user's instruction corresponding to the operation input to target manager 154, log generator 160, and encoder 161.

Encoder 161 encodes image data having been subjected to image processing including a masking process using image processor 153 to video data having a designated format. Video output unit 162 outputs video data which is output from encoder 161 as case video data after a video editing process. The case video data after the video editing process is recorded in a state of being transmitted to server 250 of case video management system 200. In addition, the case video data after the video editing process is stored in a recording medium such as a DVD or a memory card as necessary, and is used for an evidence video in a trial, or the like. When the case video data is used for an evidence video in a trial, the video data is output in a state of being converted into a format designated by a court.

Log generator 160 generates log data indicating a history (chain of custody) of each process with respect to a series of case video data editing processes including the reading of video data, the registration of a target to be masked and a target not to be masked, a masking process, the conversion of video data, and the like. The log data is stored in case video management system 200 in association with case video data, is appropriately output during the use of the case video data, and is referred to.

Figure 6:
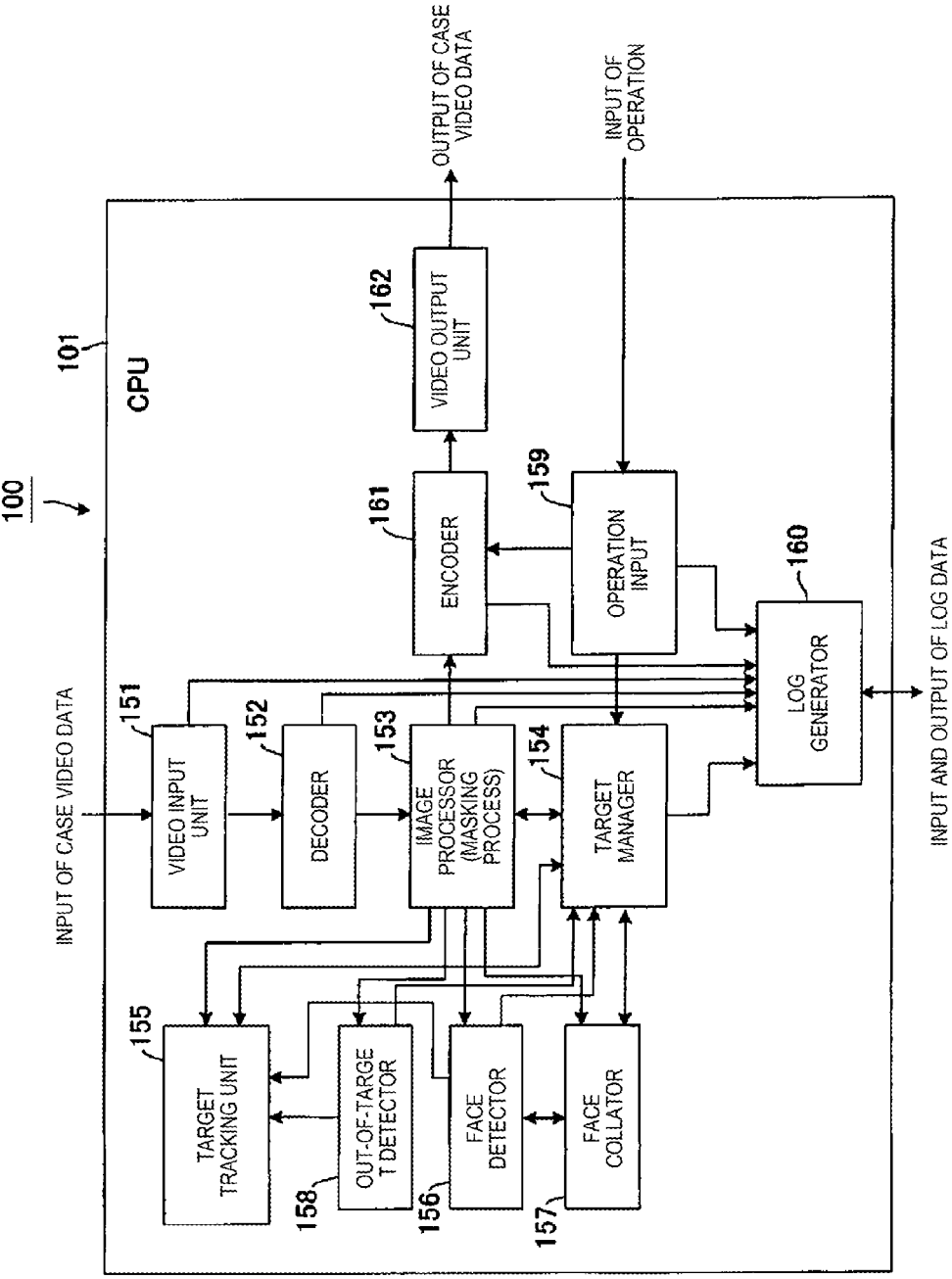
FIG. 6 is a block diagram illustrating a second example of a functional configuration of the case video processing apparatus.

FIG. 6 is a block diagram illustrating a second example of a functional configuration of the case video processing apparatus. The second example is a modification example of the first example, and is different from the first example in that out-of-target detector 158 detecting a person serving as a target not to be masked, which is present in an image is provided. The other respects are the same as those in the first example.

Out-of-target detector 158 recognizes an identification code such as a bar code or Color bit (registered trademark) in image data, and detects a person (here, an accused person) who serves as a target not to be masked. Thereby, instead of a user's instruction from operation input 159, a target not to be masked which is present in an image is detected, and a region not to be masked is automatically determined and registered. For example, in a case where an accused person is photographed inside a police station, the photographing is performed by giving an identification code to the accused person's body, clothes, or the like, and thus it is possible to easily specify the accused person in video data. In this case, it is possible to simply a user's operation of registering and tracking the target not to be masked without increasing a processing load in the case video processing apparatus. Meanwhile, as another example in which an accused person who is a target not to be masked is specified, it is possible to acquire face characteristic information of a front face and a side face of an accused person using an accused person database in a police station, to determine the accused person who is a target not to be masked in image data, and to register the accused person.

Description of Outline of Case Video Editing Process

Figure 7:
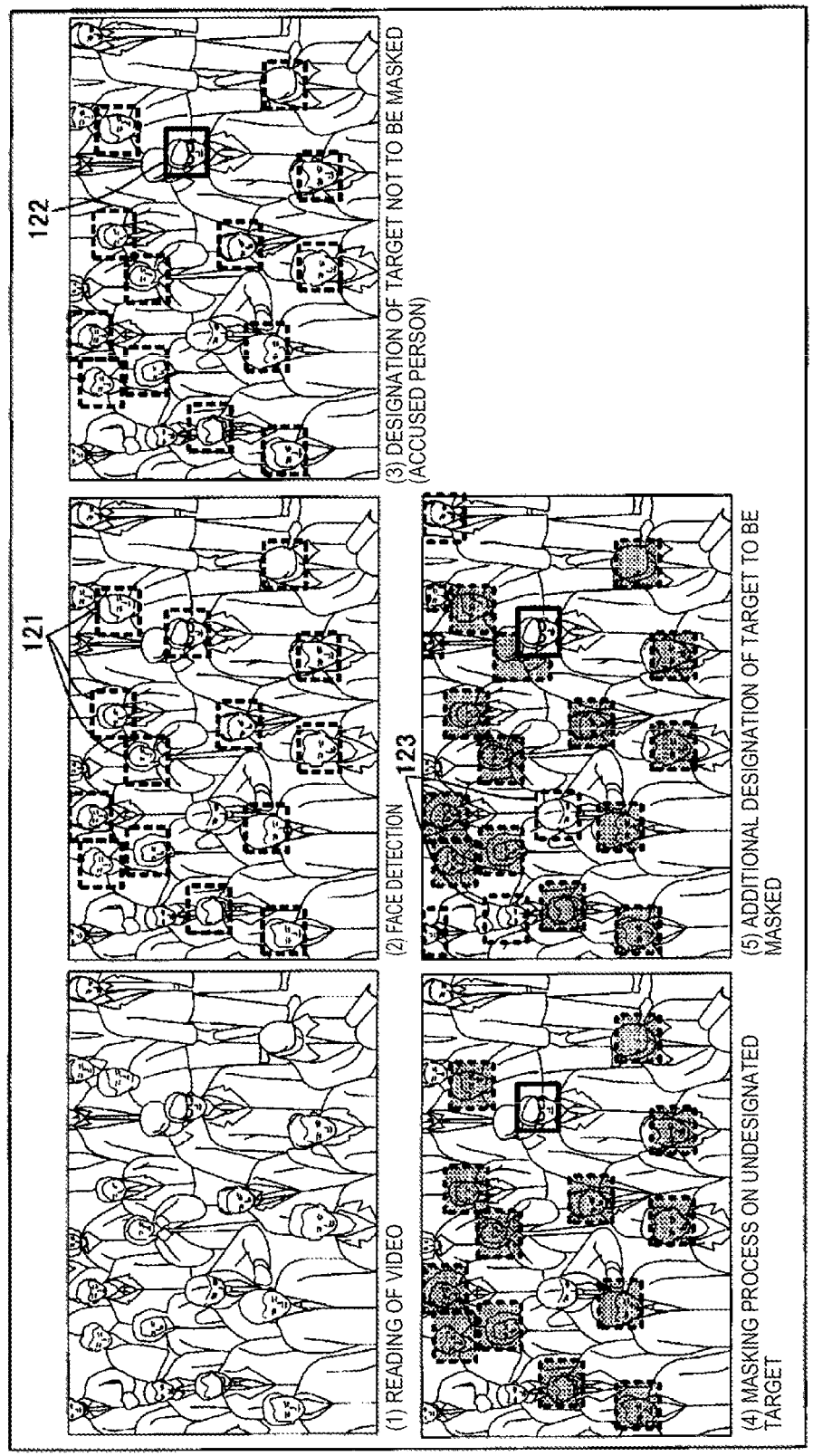
FIG. 7 is a diagram illustrating an example of a case video editing process according to the present exemplary embodiment.

FIG. 7 is a diagram illustrating an example of a case video editing process according to the present exemplary embodiment. In case video processing apparatus 100, a case video management application which is a client application of case video management system 200 is executed by CPU 101 and memory 102 as an application of the case video processing system, and a list of pieces of case video data is displayed on display 105. Next, in case video processing apparatus 100, a selection operation of a user such as a police taking charge of editing is input through input device 106, and case video data to be edited is selected from the list of the pieces of case video data in accordance with a user's instruction. In case video processing apparatus 100, a video editing application is started up by CPU 101 and memory 102 as an application of the case video processing system, and the following masking process is performed on video data as a case video editing process.

(1) Video Reading

Case video processing apparatus 100 inputs case video data to be processed from case video management system 200 or media asset management system 300, image data of a still image of a frame in which a masking process is performed by decoding the input video data is generated, and an image to be processed is displayed on display 105.

(2) Face Detection

Case video processing apparatus 100 detects a face region of a person included in image data, and to-be-masked frame 121 corresponding to the face region is generated and is displayed in an image to be processed. In addition, case video processing apparatus 100 registers the detected face region as a target to be masked. To-be-masked frame 121 is a frame that allows a user to be able to easily recognize the detection of the person's face, and is displayed by adding a frame or a mark to the vicinity of the face. To-be-masked frame 121 may be displayed as a quadrangular frame, an elliptical frame, or a mark such as an arrow. Alternatively, only face portions detected from a video may be cut out, and a list of the face portions may be displayed separately in parallel with the video.

Meanwhile, as a face detection process, person detection techniques disclosed in PTL 1 and PTL 2 mentioned below are used during face detection, and a configuration in which a target in an image is detected as a person and a face region of the person is further detected may also be adopted.

[PTL 1] Japanese Patent Unexamined Publication No. 2013-30104 (US Patent Unexamined Publication No. 2014/0164413)

[PTL 2] International Publication No. WO2013/132836 (US Patent Unexamined Publication No. 2015/0016684)

(3) Designation of Target not to be Masked (Accused Person)

In case video processing apparatus 100, a user's operation of designating a target not to be masked is input through input device 106, not-to-be-masked frame 122 corresponding to a designated region (face region of an accused person) is generated and is displayed in an image to be processed. In addition, in case video processing apparatus 100, the face region designated by the user is excluded from targets to be masked as a target not to be masked, a face characteristic of the target not to be masked is registered as face collation data.

(4) Masking Process of Undesignated Target

Case video processing apparatus 100 performs a masking process on a face region (to-be-masked frame 121) to be masked. In the present exemplary embodiment, a masking process is basically performed by all face regions detected in an image as targets to be masked. Exceptionally, a masking process is not performed by setting a face region of an accused person designated by a user's instruction as a target not to be masked. Meanwhile, the masking process includes various pieces of image processing such as filling, shading, hatching, transformation, and mosaic processing in a target region such as a person's face.

(5) Additional Designation of Target to be Masked

In case video processing apparatus 100, a user's operation of additionally designating a target to be masked is input through input device 106, and to-be-masked frame 123 corresponding to a designated region (additional face region to be masked) is generated and is displayed in an image to be processed. In addition, case video processing apparatus 100 registers an additionally designated region as a target to be masked. Thereafter, case video processing apparatus 100 performs a masking process on the face region (to-be-masked frame 123), as a target to be masked, which is additionally designated.

Case video processing apparatus 100 tracks regions as a target to be masked and a target not to be masked and performs a masking process on the target to be masked with respect to a frame of video data to be processed and the subsequent frames. When case video processing apparatus 100 fails in the tracking of the regions as a target to be masked and a target not to be masked or in the detection of a face in an image, the case video processing apparatus resets regions as a target to be masked and a target not to be masked in accordance with a user's instruction corresponding to the input of the user's operation.

Processes of Case Video Editing Process

Figure 8:
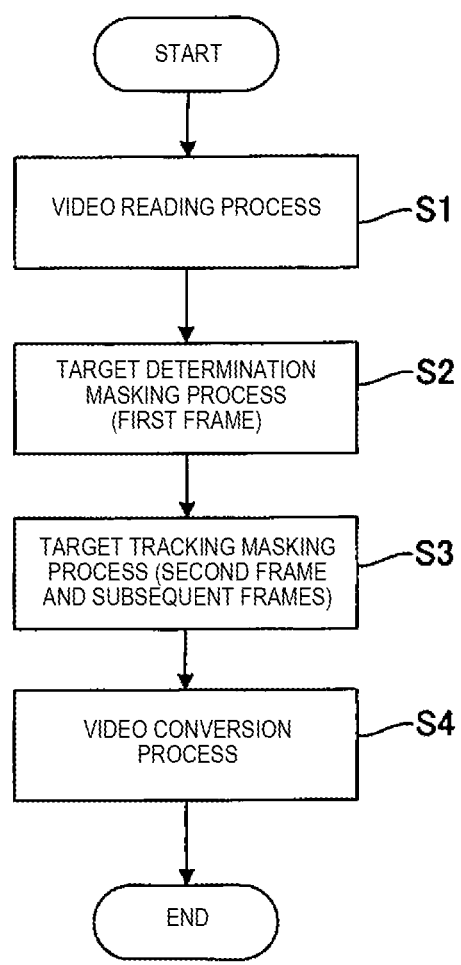
FIG. 8 is a flow chart illustrating an example of a procedure of a case video editing process according to the present exemplary embodiment.

Next, a specific example of a case video editing process performed by case video processing apparatus 100 according to the present exemplary embodiment will be described in detail. FIG. 8 is a flow chart illustrating an example of a procedure of a case video editing process according to the present exemplary embodiment.

Case video processing apparatus 100 performs a video reading process of reading case video data to be processed from case video management system 200 (step S1). At this time, the case video data to be processed is input from case video management system 200 by video input unit 151 of case video processing apparatus 100.

Next, case video processing apparatus 100 determines a target to be masked and a target not to be masked and performs a masking process on the target to be masked, with respect to an image of a first frame (step S2). At this time, image data of a still image of a frame in which an editing process is performed is generated by decoding video data which is input, by decoder 152 of case video processing apparatus 100. A face region of a person included in image data is detected by face detector 156, and the detected face region is registered as a target to be masked by target manager 154. In addition, a user's operation of designating a target not to be masked is input through operation input 159, and a designated region is excluded from targets to be masked as a target not to be masked by target manager 154. In addition, face collator 157 registers face collation data which is a face characteristic of the target not to be masked. Image processor 153 performs a masking process on a face region of the target to be masked.

Case video processing apparatus 100 tracks a target to be masked and a target not to be masked and performs a masking process on the target to be masked with respect to images of a second frame and the subsequent frames (step S3). At this time, the detection of a face region in an image, the tracking of a target to be masked, the tracking of a target not to be masked, and face collation are performed by target manager 154, face detector 156, and face collator 157 of case video processing apparatus 100, and regions of a target to be masked and a target not to be masked are captured. Image processor 153 performs a masking process on a face region to be masked.

When a masking process performed on each frame of video data is terminated, case video processing apparatus 100 performs a video conversion process of converting the processed video data into a predetermined format (step S4). At this time, video data having a predetermined format is generated by encoding image data of each frame after an editing process by encoder 161 of case video processing apparatus 100, and the generated video data is output to case video management system 200 and the like by video output unit 162.

In the above-mentioned case video editing process, case video processing apparatus 100 records a history of each process in log data.

Figure 9:
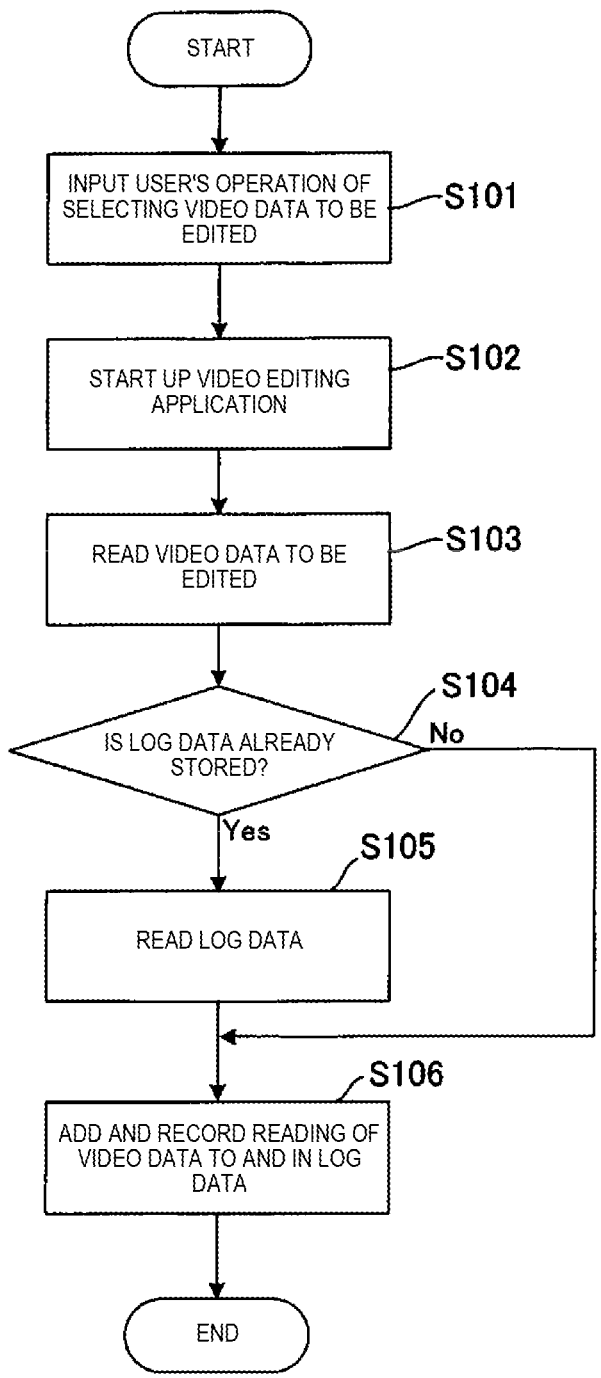
FIG. 9 is a flow chart illustrating an example of a procedure of a video reading process.

FIG. 9 is a flow chart illustrating an example of a procedure of a video reading process. FIG. 9 illustrates details of the video reading process (S1) in FIG. 8.

Operation input 159 of case video processing apparatus 100 inputs a user's operation of selecting video data to be edited during the start-up of a case video management application (step S101). When the selection of the video data to be edited is input, image processor 153 starts up a video editing application and starts an editing process (step S102). Hereinafter, functions of the video editing application are executed in case video processing apparatus 100. First, video input unit 151 inputs and reads video data to be processed from case video management system 200 or media asset management system 300 (step S103).

Here, log generator 160 determines whether log data regarding video data to be processed is already stored in case video management system 200 (step S104). When the log data is stored in the case video management system, the log data is read from case video management system 200 (step S105). When the log data is not stored in the case video management system, log generator 160 newly generates log data regarding video data to be processed. Log generator 160 adds and records the reading of the video data to be processed to and in the log data as a log (step S106). As a history of the input of the video data, a file name and a reading date and time of the video data, and the like may be recorded, and video management data such as a case number of the corresponding case may also be recorded. In addition, an event such as login of a user who starts up a video editing application and performs an editing operation may be recorded in the log data as a log.

Regarding video data to be processed, the entire video data of each video file which is stored in case video management system 200 may be read and subjected to an editing process, or only a necessary portion may be read and subjected to an editing process by cutting out a portion of the video data such as a time zone of a specific scene or a specific region in an image. In this case, the cut-out of a portion of the video data and information regarding a cut-out position are recorded in the log data.

Figure 10:
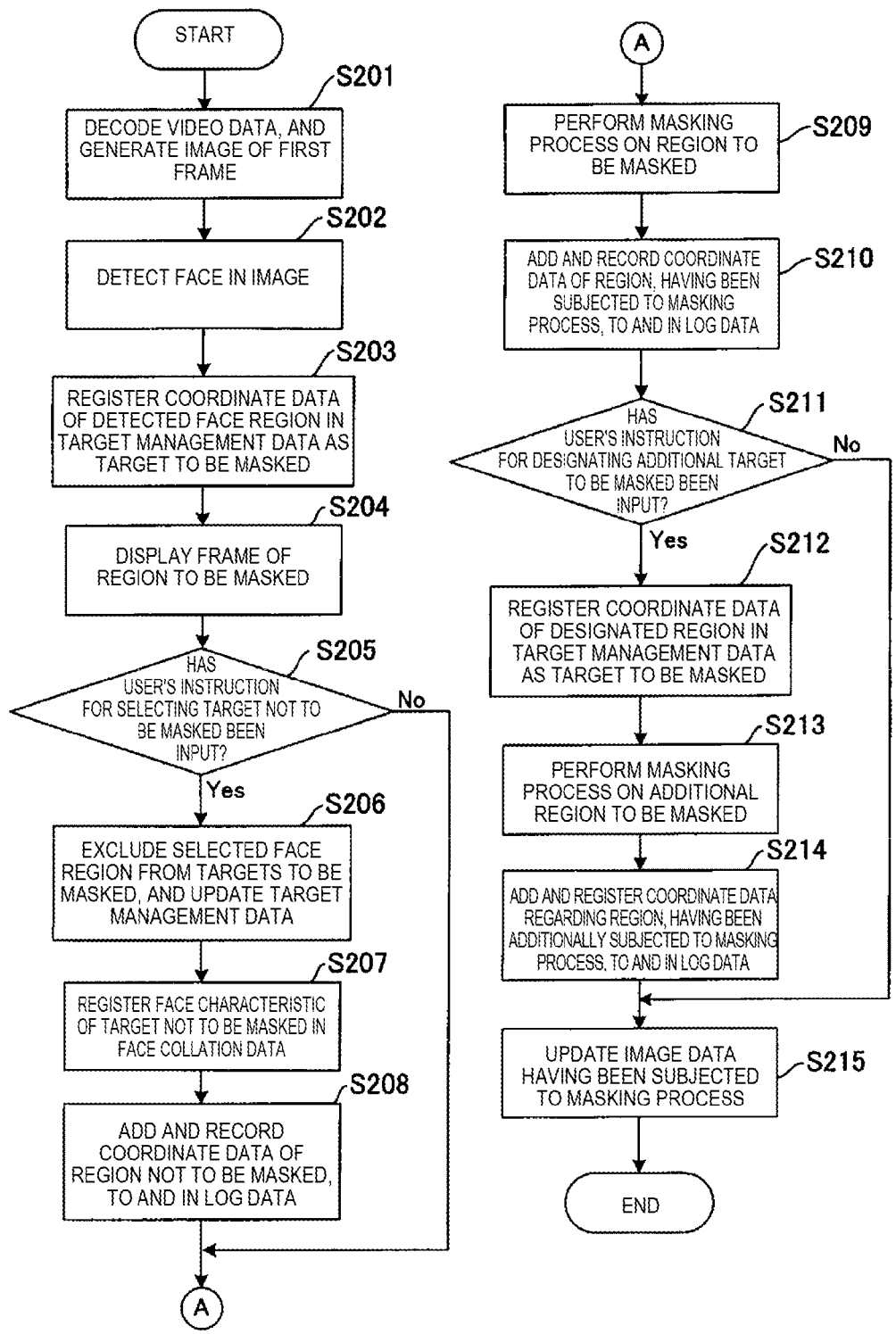
FIG. 10 is a flow chart illustrating an example of a procedure of a target determination and masking process for a first frame of video data.

FIG. 10 is a flow chart illustrating an example of a procedure of a target determination and masking process for a first frame of video data. FIG. 10 illustrates details of the target determination and masking process (first frame) (S2) in FIG. 8.

Decoder 152 of case video processing apparatus 100 generates image data of a first frame by decoding video data, as a target to be processed, which is input (step S201). Face detector 156 detects a face region of a person in an image and outputs coordinate data regarding the face region with respect to the image data of the first frame (step S202). Target manager 154 registers the coordinate data regarding the detected face region in target management data as a target to be masked (step S203). In addition, image processor 153 generates to-be-masked frame 121 indicating the region to be masked and displays the generated frame in an image to be processed (step S204).

Next, target manager 154 determines whether a user's instruction for selecting a target not to be masked (face region of an accused person) has been input through operation input 159, with respect to the detected face region (step S205). When the selection of the target not to be masked has been input, target manager 154 excludes the selected face region from targets to be masked and updates target management data so as to set the selected face region as a target not to be masked (step S206). In addition, face collator 157 registers a face characteristic which is set as a target not to be masked in face collation data (step S207). Log generator 160 adds and records coordinate data regarding a region, as a target not to be masked, to and in log data as a history of the target not to be masked (step S208). In addition, image processor 153 generates not-to-be-masked frame 122 indicating a designated region not to be masked and displays the generated frame in an image.

At this time, when a user visually determines and selects a face of an accused person, the user records his or her selection operation in log data. In addition, when accused person information such as an accused person name is acquired from case video management system 200 and the user selects the accused person from a list of accused persons, an operation of selecting the accused person information is recorded in log data. In this case, for example, in the display screen of the image to be processed which is illustrated in FIG. 7, accused person information such as an accused person name corresponding to the case may be popped up at any position such as the vicinity of not-to-be-masked frame 122, and a process of causing a user to select an accused person from a plurality of accused person candidates may be performed. In addition, a face characteristic such as a photo of the accused person's face may be acquired as accused person information, and may be displayed on the screen showing the selection candidates together with the accused person name.

Next, image processor 153 performs a masking process on a region to be masked (step S209). As the masking process, various pieces of image processing such as filling, shading, hatching, transformation, and mosaic processing of a target region can be used. Log generator 160 adds and records coordinate data regarding a region having been subjected to a masking process to and in log data as a history of the target to be masked (step S210). In this manner, a target to be masked is automatically extracted in image data by face detection, a masking process is performed on the target to be masked, and a face region designated by a user's operation is excluded from a masking process as a target not to be masked.

Thereafter, target manager 154 determines whether a user's instruction for designating an additional target to be masked has been input through operation input 159 (step S211). In image data, erroneous face detection, such as a face facing sideward or downward, may be performed by face detector 156. In this case, a user views a display screen of an image to be processed to recognize an additional target to be masked, and performs an operation of instructing a region to be added as a target to be masked using input device 106.

When the designation of an addition target to be masked is input, target manager 154 sets coordinate data regarding a designated region as a target to be masked, and adds and registers the coordinate data to and in target management data (step S212). In addition, image processor 153 generates to-be-masked frame 123 indicating a region to be masked which is additionally designated, and displays the generated frame in an image. Image processor 153 performs a masking process on the additional region to be masked (step S213), and log generator 160 adds and registers coordinate data regarding a region, having been additionally subjected to a masking process, to and in log data as a history of the target to be masked (step S214).

Meanwhile, when a portion other than a face is erroneously detected by face detector 156, a user may visually recognize a target not to be masked and may perform an operation of instructing a region to be excluded from targets to be masked, using input device 106. In this case, target manager 154 and image processor 153 exclude a designated region from targets to be masked and cancel a masking process. Alternatively, on the contrary to the above description, a masking process may be performed not only on a face region of a person based on face detection but also on an object (including clothes, one's belongings, and the like) other than a face.

When the masking process is terminated, image processor 153 updates an image of a first frame to image data having been subjected to the masking process (step S215).

Figure 11:
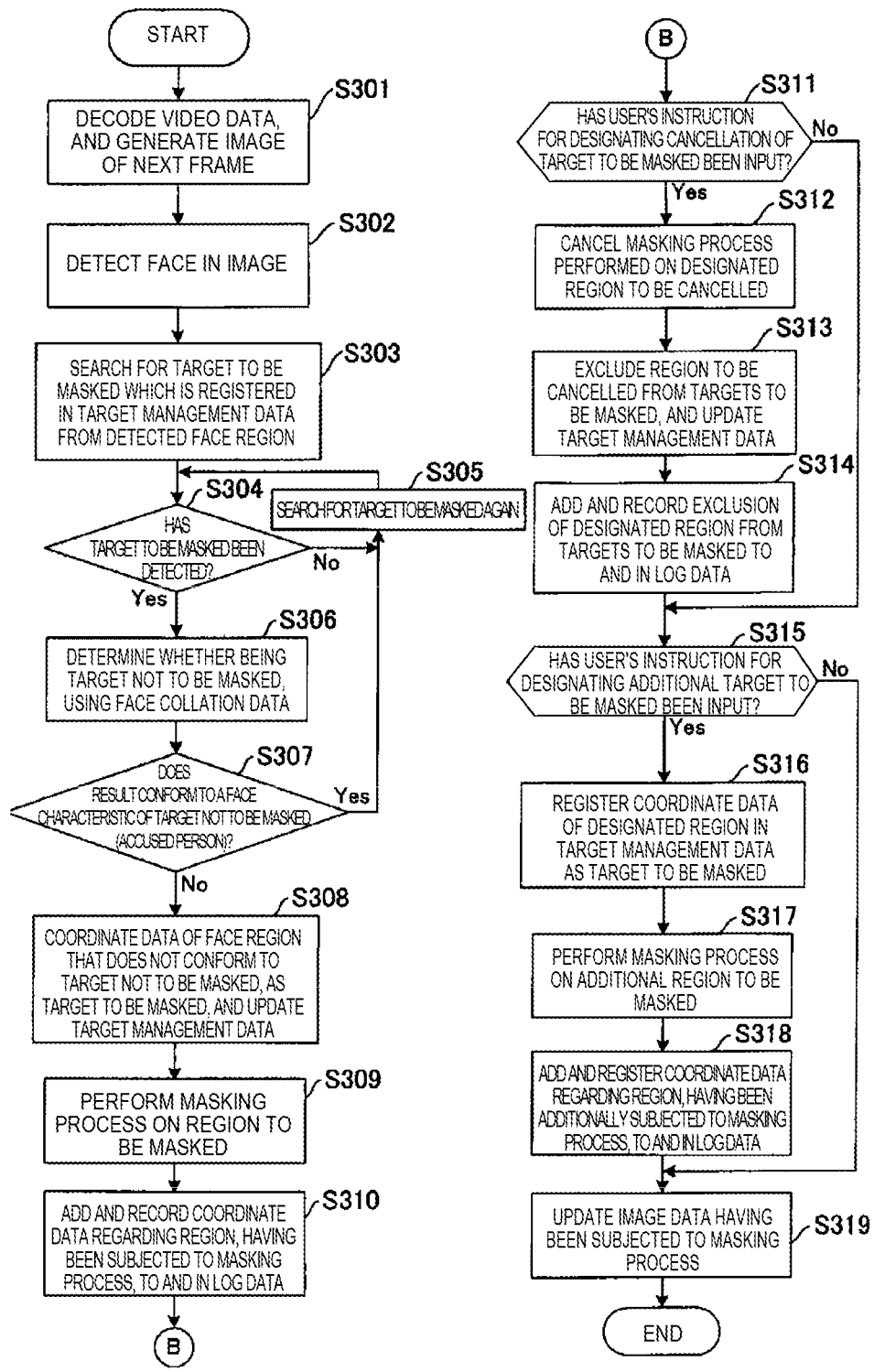
FIG. 11 is a flow chart illustrating an example of a procedure of a target tracking and masking process for a second frame and the subsequent frames of video data.

FIG. 11 is a flow chart illustrating an example of a procedure of a target tracking and masking process for a second frame and the subsequent frames of video data. FIG. 11 illustrates details of the target tracking and masking process (second frame and the subsequent frames) (S3) in FIG. 8.

Decoder 152 of case video processing apparatus 100 decodes video data to be processed to thereby generate image data of the next frame (step S301). Face detector 156 detects a face region of a person in an image and outputs coordinate data regarding the face region with respect to the image data of the next frame (step S302). Target manager 154 searches for a target to be masked in the previous frame registered in target management data, from the coordinate data regarding the detected face region (step S303). In this case, a face region corresponding to the target to be masked in the previous frame is searched for from the same coordinates or coordinates in the vicinity thereof with respect to the detected face region on the basis of a difference from the previous frame.

As a result of searching for the target to be masked, when target manager 154 has not detected a target to be masked (step S304, No), target manager 154 searches for a target to be masked again by extending a searching region or increasing the intensity of face detection performed by face detector 156 (step S305).

As a result of searching for a target to be masked by target manager 154, when a target to be masked has been detected (step S304, Yes), face collator 157 determines whether the target to be masked is a face region which is set as a target not to be masked in the previous frame, using registered face collation data (step S306). Here, as a result of face collation by face collator 157, when the result conforms to a face characteristic of an accused person who is set as a target not to be masked (step S307, Yes), target manager 154 searches for a target to be masked again by extending a searching region or increasing the intensity of face detection by face detector 156 (step S305).

In addition, as a result of face collation by face collator 157, when the result does not conform to the face characteristic of the accused person who is set as a target not to be masked (step S307, No), target manager 154 recognizes coordinate data regarding a face region that does not conform to the target not to be masked, as a target to be masked and updates target management data (step S308).

Next, image processor 153 performs a masking process on a region to be masked (step S309), and log generator 160 adds and records coordinate data regarding the region having been subjected to the masking process to and in log data as a history of the target to be masked (step S310). In this manner, a target to be masked is automatically tracked in image data of a second frame and the subsequent frames, and a masking process is performed thereon without a user's operation.

Thereafter, target manager 154 determines whether a user's instruction for designating the cancellation of a target to be masked has been input through operation input 159 (step S311). In face collation by face collator 157, the face collation is not normally performed in spite of being a face region of an accused person, and the face region may be masked as a target to be masked. In this case, a user views a display screen of an image to be processed to recognize an accused person as a target not to be masked, and performs an operation of instructing the cancellation of a masking process on the region using input device 106.

When the designation of masking cancellation is input, image processor 153 cancels a masking process performed on a designated region to be cancelled (step S312). In addition, target manager 154 excludes the designated region to be cancelled from targets to be masked and updates target management data so as to set the designated region as a target not to be masked (step S313). Log generator 160 adds and records the exclusion of the designated region from targets to be masked to and in log data as a history of the target not to be masked (step S314).

Thereafter, target manager 154 determines whether a user's instruction for designating an additional target to be masked has been input through operation input 159 (step S315). When the designation of the additional target to be masked has been input, target manager 154 sets coordinate data regarding the designated region as a target to be masked, and adds and registers the coordinate data to and in target management data (step S316). Image processor 153 performs a masking process on the additional region to be masked (step S317), and log generator 160 adds and registers coordinate data regarding a region, having been additionally subjected to a masking process, to and in log data as a history of the target to be masked (step S318).

When the masking process is terminated, image processor 153 updates an image of the next frame to image data having been subjected to the masking process (step S319). The above-mentioned process is repeatedly performed in the same manner on image data of a second frame and the subsequent frames until the final frame of the video data to be processed.

Figure 12:
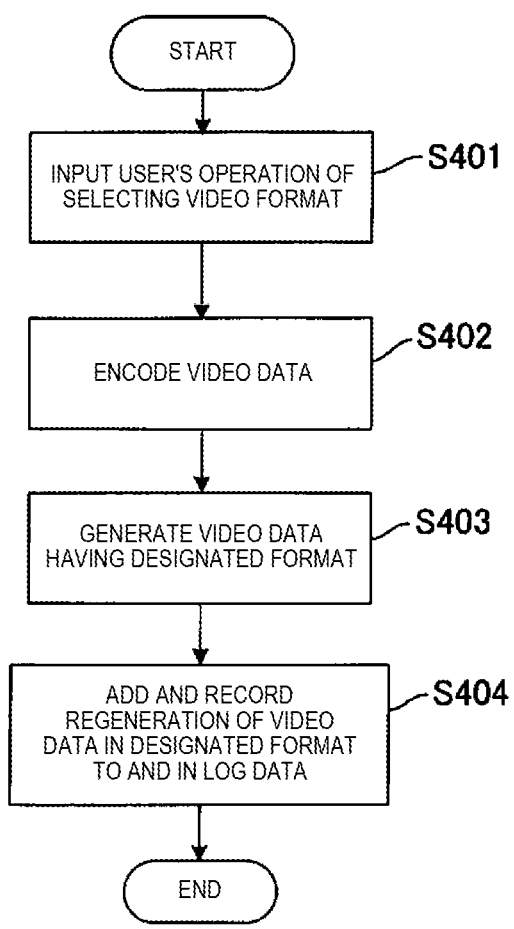
FIG. 12 is a flow chart illustrating an example of a procedure of a video conversion process.

FIG. 12 is a flow chart illustrating an example of a procedure of a video conversion process. FIG. 12 illustrates details of the video conversion process (S4) in FIG. 8.

Operation input 159 of case video processing apparatus 100 inputs a user's operation of selecting an output format with respect to video data having been subjected to an editing process (step S401). At this time, case video processing apparatus 100 displays, for example, a selection screen of an output format of video data on display 105 and waits for the input of a user's operation through input device 106.

When the input of selection of an output format of video data is received, encoder 161 encodes image data, having been subjected to an editing process by image processor 153, in accordance with a designated format (step S402). Encoder 161 generates video data having a designated format to thereby perform video conversion (step S403). In addition, log generator 160 adds and records the regeneration of video data in the designated format to and in log data as a history of the video conversion (step S404). Thereafter, video output unit 162 outputs the video data to case video management system 200 or media asset management system 300 as case video data having been subjected to a video editing process.

Meanwhile, in the above-mentioned processing example, with respect to video data to be processed, encoding is performed after a series of processes including a masking process and the generation of a log is terminated. However, an encoding process may be automatically performed in the background after a masking process for a predetermined number of frames is completed. Thereby, it is possible to reduce a load of a video conversion process.

Log Data Generation Process

Next, a specific example of a log data generation process performed by log generator 160 of case video processing apparatus 100 will be described. FIG. 13 is a diagram illustrating an example of log data regarding a case video editing process.

Case video processing apparatus 100 generates log data, for example, as illustrated in FIG. 13 as a case video log data generating apparatus in order to record a history of each of processes related to a case video data editing process.

In the example of FIG. 13, a log including an execution time, an execution user name, and processing contents is shown with respect to each process from the start-up of a video editing application to the execution of a masking process. In this case, the start-up of an application (video editing application) of a case video processing system (System X), a user's success in logging on an application, a file name (xxxxx.av3) of case video data to be edited and the reading thereof, a case number (12345-5555) corresponding to input video data, an accused person name (Jiro Yougisha) as accused person information corresponding to input video data, and the like are recorded in log data.

In addition, a frame number (60) of video data to be edited, an accused person name, and the designation of coordinates and a size (x:280,y:300 ROI 40,64) of the corresponding region not to be masked (frame not to be masked), the designation of coordinates and a size (x:240, y:100 ROI 30,56, and the like) of a region to be masked (frame to be masked), the execution of a masking process on a region to be masked, and the like are recorded in the log data.

In the present exemplary embodiment, actions of a user (editor) which is related to the selection of a video or the correction of a region to be masked or a region not to be masked, such as the reading of video data to be processed by the user's selection, the setting of a region not to be masked by the user's designation, and the setting of an additional region to be masked by the user's designation, are recorded in log data as a history of editing. Thereby, it is possible to record the user's appropriate recognition of an accused person and the selection of the accused person as a target not to be masked, in log data, and to confirm later whether an appropriate masking process has been performed. In addition, various processes, such as the setting of a region to be masked based on face detection and a masking process performed on a region to be masked, which have been performed on video data by a video editing application are recorded in log data. In addition, when accused person information such as an accused person name is acquired from case video management system 200, the accused person information is recorded in log data together with a file name of video data, and the like.

Case video processing apparatus 100 outputs generated log data to case video management system 200, and stores case video data and the log data, associated with each other, in a database of case video management system 200.

Figure 14:
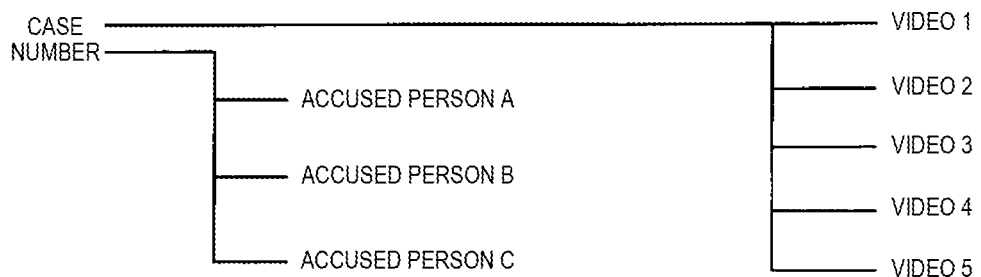
FIG. 14 is a diagram illustrating an example of correspondence between a case number and video data.

FIG. 14 is a diagram illustrating an example of correspondence between a case number and video data. In case video management system 200, a case number is allocated to each case, and a specific case number is stored in association with corresponding pieces of video data (videos 1 to 5). In addition, when recording is performed together with information regarding an accused person, the recording is performed in association with pieces of accused person information (accused persons A to C) corresponding to a case number.

FIG. 15 is a diagram illustrating an example of video management data of a case video. The video management data includes management information such as a case number, an accused person name, a retention period, and a video data file name, and is stored in case video management system 200 in association with video data. It is possible to easily extract related information such as video data corresponding to a specific case number, an accused person, a retention period of the video data, by the video management data.

Figure 16:
FIG. 16 is a diagram illustrating an example of correspondence between log data and video management data.

FIG. 16 is a diagram illustrating an example of correspondence between log data and video management data. In case video management system 200, log data, generated by case video processing apparatus 100, which is included in video management data is recorded. In this case, the video management data includes a log data file name in addition to items of video management data illustrated in FIG. 15, and is stored in association with video data.

Meanwhile, in a case video data editing process in case video processing apparatus 100, it is possible to continuously edit pieces of video data of a plurality of different case numbers and to edit video data of one case number a plurality of times. For this reason, as illustrated in FIG. 16, a case where video data (xxxx.av3) of case A (case number 12345-5555), video data (yyyy.av3) of case B (case number 99999-1111), and video data (zzzz.av3) of case A (case number 12345-5555) are edited in order is assumed. In this case, pieces of log data regarding respective editing processes which are arranged for each case number are recorded. Thereby, it is possible to easily refer to a history of editing of video data for each case.

Meanwhile, in video management data, for example, when an accused person A and an accused person B are registered with respect to case A, whereas only the accused person A can be confirmed in a case where video data is actually edited, it is also possible to correct accused person information by a video editing application of case video processing apparatus 100. In this case, the accused person information corrected in case video processing apparatus 100 is reflected on video management data of case video management system 200 to update contents of the accused person information, and a history of a process of correcting the accused person information is added to log data.

In this manner, in the present exemplary embodiment, with respect to video data to be edited, all face regions detected in an image are set as targets to be masked, a face region of an accused person which is designated by a user's instruction among the targets to be masked is set as a target not to be masked and is excluded from the targets to be masked, and a masking process is performed on the targets to be masked. According to the present exemplary embodiment, it is possible to appropriately perform a masking process on a necessary target such as a person unrelated to a case in case video data, and to perform privacy protection in a more appropriate form. In addition, it is possible to store an intact video record without performing a masking process with respect to an accused person related to the case and to effectively use the video record as an evidence video of the case, or the like.

In addition, in the present exemplary embodiment, regarding a series of case video data editing processes including the reading of video data, the registration of a target to be masked and a target not to be masked, a masking process, the conversion of video data, and the like, log data indicating a history of each process is generated and is stored in association with case video data in the case video management system. According to the present exemplary embodiment, when an editing process such as a masking process is performed on video data, it is possible to appropriately record a history of each process and to easily confirm contents of a process performed later through log data. In addition, when edited video data is used as an evidence video of a case, or the like, it is possible to determine whether a process for privacy protection is appropriately performed and whether an accused person is appropriately determined and is set as a target not to be masked, with reference to log data.

Although the exemplary embodiment of the case video processing apparatus and the case video processing system according to the invention has been described so far with reference to the accompanying drawings, the present disclosure is not limited thereto. It would be apparent for those skilled in the technical field to which the invention belongs that various modified examples, corrected examples, replacement examples, addition examples, deletion examples, or equivalent examples are conceivable within the scope of the technical idea recited in the claims, and it would be understood that these fall within the technical scope of the invention.

What is claimed is:

1. A case video processing apparatus that performs image processing of a video data file including a first frame and a second subsequent frame and being related to a case, the case video processing apparatus comprising:
   a processor; and
   a memory,
   wherein, in cooperation with the memory, the processor,
   inputs the video data file to be processed,
   detects a face region of a person included in an image of the first frame of the video data file,
   registers the face region as a region to be masked,
   inputs a user's instruction regarding the face region,
   excludes a region designated by the user's instruction from targets to be masked and registers the region designated by the user's instruction as a region not to be masked,
   registers a face characteristic of a target in the region not to be masked,
   inputs a user's instruction which selects for masking an undetected face region of a person in the first frame of the video data file,
   registers the undetected face region selected by the user's instruction as an additional target to be masked,
   outputs video data having been subjected to image processing including excluding a region designated by the user's instruction from targets to be masked and masking the additional target,
   detects a face region of a person included in an image of the second subsequent frame of the video data file,
   identifies the region to be masked which is registered for the first frame of the video data file,
   determines whether the detected face region of a person included in an image of the second subsequent frame of the video data file conforms to the registered face characteristic of a target in the region not to be masked,
   includes, the detected face region of a person included in an image of the second subsequent frame of the video data file, in the targets to be masked, when the detected face region of a person included in an image of the second subsequent frame of the video data file does not conform to the registered face characteristic of a target in the region not to be masked,
   excludes, the detected face region of a person included in an image of the second subsequent frame of the video data file, from targets to be masked, when the detected face region of a person included in an image of the second subsequent frame of the video data file conforms to the registered face characteristic of a target in the region not to be masked,
   inputs a user's instruction which selects for masking a face region included in an image of the second subsequent frame of the video data file,
   registers the face region selected by the user's instruction as an additional region to be masked, and
   performs a masking process on regions to be masked which include the additional region.

2. The case video processing apparatus of claim 1,
   wherein, in cooperation with the memory, the processor,
   displays an image of the video data file to be processed on a display, and
   displays a to be masked frame of the video data file which indicates the region to be masked in the image.

3. The case video processing apparatus of claim 1,
   wherein, in detecting the face region of a person included in an image of the first frame of the video data file, the processor in cooperation with the memory detects a person included in an image of the first frame of the video data file, detects a face region from the person, and sets the face region as a region to be masked.

4. A case video processing method in a case video processing apparatus that performs image processing of a video data file including a first frame and a second subsequent frame and being related to a case, the case video processing method comprising:
   inputting the video data file to be processed;
   detecting a face region of a person included in an image of the first frame of the video data file;
   registering the face region as a region to be masked;
   inputting a user's instruction regarding the face region;
   excluding a region designated by the user's instruction from targets to be masked and registering the region designated by the user's instructions as a region not to be masked;
   registering a face characteristic of a target in a region not to be masked;
   inputting a user's instruction which selects for masking an undetected face region of a person in the first frame of the video data file,
   registering the undetected face region selected by the user's instruction as an additional target to be masked,
   outputting video data having been subjected to image processing including excluding a region designated by the user's instruction from targets to be masked and masking the additional target;
   detecting a face region of a person included in an image of the second subsequent frame of the video data file;
   identifying the region to be masked which is registered for the first frame of the video data file;
   determining whether the detected face region of a person included in an image of the second subsequent frame of the video data file conforms to the registered face characteristic of a target in the region not to be masked;
   including, the detected face region of a person included in an image of the second subsequent frame of the video data file, in the targets to be masked, when the detected face region of a person included in an image of the second subsequent frame of the video data file does not conform to the registered face characteristic of a target in the region not to be masked;

excluding, the detected face region of a person included in an image of the second subsequent frame of the video data file, from targets to be masked, when the detected face region of a person included in an image of the second subsequent frame of the video data file conforms to the registered face characteristic of a target in the region not to be masked;

inputting a user's instruction which selects for masking a face region included in an image of the second subsequent frame of the video data file;

registering the face region selected by the user's instruction as an additional region to be masked, and performing a masking process on regions to be masked which include the additional region.

5. The case video processing method of claim 4, further comprising:

displaying an image of the video data file to be processed on a display, and displaying a to be masked frame of the video data file which indicates the region to be masked in the image.

\* \* \* \* \*